Nov. 21, 1967  N. H. MacNEIL  3,353,410

OVERLOAD STOP FOR PRESSURE TRANSDUCER

Filed July 27, 1965

INVENTOR.

NORMAN H. MACNEIL 3,353,410
Patented Nov. 21, 1967

3,353,410
OVERLOAD STOP FOR PRESSURE TRANSDUCER
Norman H. MacNeil, Waltham, Mass., assignor to Hewlett-Packard Company, Palo Alto, Calif., a corporation of California
Filed July 27, 1965, Ser. No. 475,178
7 Claims. (Cl. 73—406)

ABSTRACT OF THE DISCLOSURE

An overload stop for a pressure transducer is positioned relative to the distended configuration of the transducer's diaphragm to absorb as much of the force applied to the diaphragm as possible.

---

Figure 1:
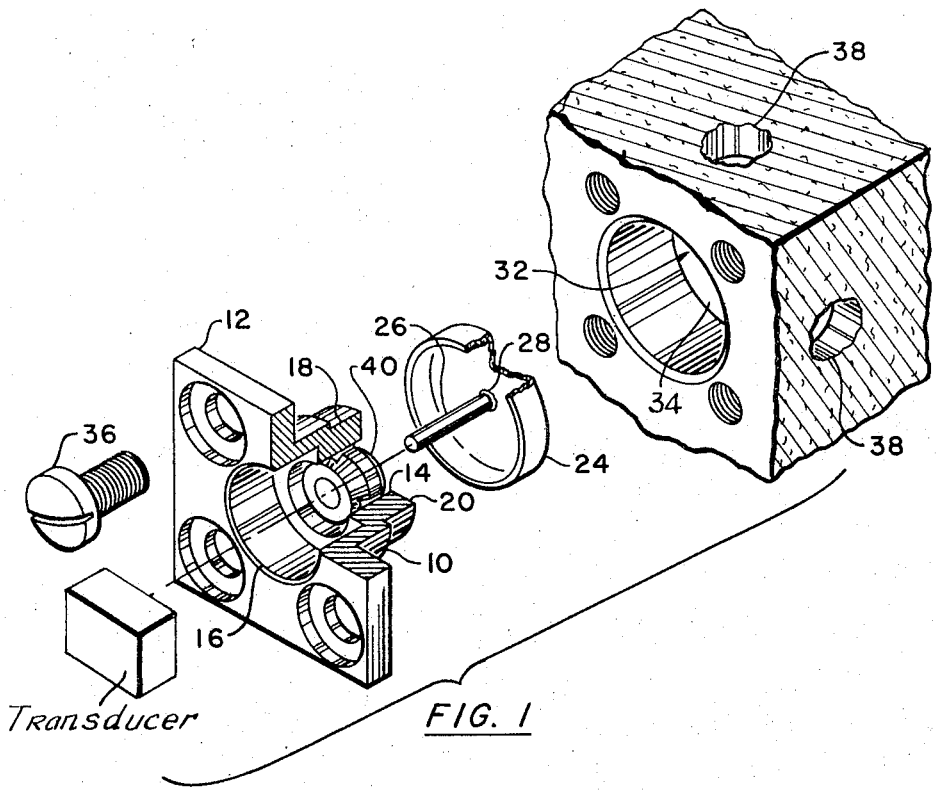

This invention relates to a fluid pressure transducer and, more particularly, to a pressure transducer having provision for protection against excessive overload pressures.

In fluid pressure transducers of the diaphragm type designed to operate over ranges encompassing relatively high pressures it is a simple matter to make provision for overload pressures. In such transducers, the overload factor of safety necessary to avoid damage to the transducer need only be from one and one-half to two times the full scale value of the intended operating range. A problem arises, however, in pressure transducers designed to operate over low ranges of pressures, say in the range of 0 to a few pounds per square inch (p.s.i.). In this instance the needed ratio of overload to full scale value usually becomes larger. In liquid systems it is often desirable to flush the system for the purpose of removing bubbles. During flushing, the possibility of severe overload pressures occurring is a very real problem. If the transducer displaces a low volume, there is the danger of excessive pressures due to system volume changes such as typically occur as the result of valve motion, connecting or disconnecting fluid lines, temperature changes, etc.

Overload stops have been used extensively to avert damage to the transducer. While quite satisfactory in the general case, such stops have often been somewhat less than satisfactory when the diaphragm displacements are small, i.e., in the range of a few hundred micro inches to ten or so milli inches. In this case many conditions must be met for successful operation. The overload stop must on the one hand not interfere with the normal operating range of the transducer and yet must be sufficiently close to the diaphragm to provide the necessary protection. The overload protector or stop should uniformly contact as large a portion of the surface area of the diaphragm as is possible so as to be capable of absorbing a greater amount of the force produced by the fluid acting on the diaphragm.

It is, therefore, an object of this invention to obviate many of the disadvantages of the prior art overload protectors for pressure transducers.

Another object of the invention is to provide an improved pressure transducer overload stop that is capable of satisfactory operation with pressure transducers having relatively low operating ranges and displacements.

In a preferred embodiment of this invention an overload stop is provided for a diaphragm type pressure transducer that is so positioned and aligned relative to the diaphragm's distention as to engage a substantial portion of the diaphragm surface under overload conditions. The stop, itself, during installation is permitted to rest upon the diaphragm while the diaphragm is distended by a predetermined overload pressure. The overload stop is cemented in position while the diaphragm is thus distended whereby the stop more nearly conforms with the precise distention configuration of the particular diaphragm with which it is used.

Figure 2:
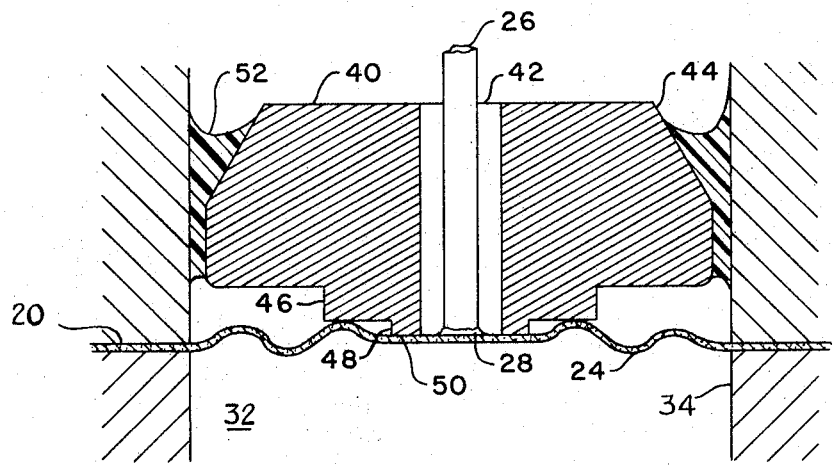

The novel features that are considered characteristic of this invention are set forth with particularity in the appended claims. The invention, itself, however, both as to its organization and method of operation, as well as additional objects and advantages thereof, will best be understood from the following description when read in connection with the accompanying drawings, in which:

FIGURE 1 is an exploded view partly cut-away of a pressure transducer constructed in accordance with this invention; and FIGURE 2 is an enlarged partial sectional view of a portion of the pressure transducer of FIG. 1 to more clearly illustrate its manner of construction.

In the drawing there is illustrated a diaphragm retainer housing 10 which may be constructed from a piece of bar stock of a copper-nickel alloy available commercially under the trademark Monel. This alloy has corrosion resistant properties. The housing 10 is formed to have a flange 12 on one end and a central axial bore 14. The axial bore 14 has a counter bore 16 at the flanged end to facilitate assembly of the transducer as will be described. The peripheral end of the housing 10 opposite the flange 12 has a stepped portion 18 of reduced diameter so as to form an annular end face 20 adapted to engage a disc-shaped diaphragm 24. The diaphragm 24 may also be made of a corrosion-resistant alloy such as Monel that has suitable spring tension properties.

A rod 26 is attached as by a soft solder or cement to the center of the diaphragm 24 and is positioned normal to the plane of the diaphragm so as to be capable of transmitting diaphragm motion to a displacement transducer of known type. Any suitable displacement transducer may may be employed as desired. One type, by way of example, is that described in U.S. Patent 3,181,055 issued to Bischof on April 27, 1965.

A cup-shaped fluid compartment 32 is also formed from a suitable corrosion-resistant alloy such as Monel. The fluid compartment 32 is formed by cutting a stepped recess 34 into one face of a piece of bar stock. The stepped recess 34 in the fluid compartment 32 engages the periphery of the diaphragm 24 against the annular end face 20 of the diaphragm housing 10. Suitable screws 36 may apply the necessary compression to render this seal fluid tight. In this manner the diaphragm 24 closes one wall of the fluid compartment. Suitable ports 38 may be formed in the fluid compartment 32 to provide a fluid access thereto. Depending upon the pressure of the fluid in the compartment 32, the diaphragm 24 will distend a greater or lesser amount. The particular configuration of the diaphragm distention may vary from diaphragm to diaphragm thereby rendering it somewhat difficult to suitably position a diaphragm stop to protect against overload pressures of the fluid and yet not interfere with the diaphragm action.

In accordance with this invention a cylindrical diaphragm overload stop member 40 is formed from a corrosion-resistant rod stock such as used for the housing 10. The overload stop 40 is formed to have an axial bore 42. Its outer periphery at one end is chamfered at 44. The remaining end is formed with a stepped portion 46 of reduced diameter and a second stepped portion 48 of still further reduced diameter so as to form a stepped annular end face 50 suitable for contacting an annular portion of the diaphragm 24.

To install the overload stop 40, a pressure somewhat beyond the normal working range of the transducer is applied to the diaphragm 24 while the overload stop 40 is resting on the diaphragm itself. The overload stop thus assumes whatever position is necessary to conform generally to the distended configuration of the diaphragm 24. While supported in this position a suitable hardenable liquid 52 is introduced into the gap between the periphery of the overload stop 40 and the bore 14 in the diaphragm housing 10. The liquid 52 is allowed to harden while the fluid pressure on the diaphragm is maintained. One suitable liquid for this purpose is an epoxy resin such as Hysol Resin R8–2038 and Adduct Hardener H2–3475 available from Hysol Corporation, Olean, N.Y.

It is desirable that the gap between the periphery of the overload stop 40 and the bore 14 be of capillary dimension such that the hardenable liquid 52 when introduced into the chamfered area is in effect drawn into the entire region of the gap area by capillary action. The stepped portion 46 prevents the capillary action from pulling the cement down to the region of the diaphragm so as to impede diaphragm action. The chamfered area facilitates filling the proper amount of hardenable liquid 52 without over-filling.

The advantages of this invention are many; firstly, the overload stop is sufficiently removed from the diaphragm and positioned with respect thereto so as to not interfere with diaphragm action over its normal working range. On the other hand, once an overload condition occurs, since the stop is fixed relative to a particular overload condition for a particular diaphragm, the annular end face 50 of the overload stop 40 makes a uniform contact over a relatively large portion of the diaphragm so as to absorb a greater portion of force generated by the pressure acting on the diaphragm. The overload stop is particularly useful when employed with diaphragms in which the displacement motion is relatively small.

It will be obvious that various modifications may be made in the apparatus and in the manner of operating it. It is intended to cover such modifications and changes as would occur to those skilled in the art, as far as the following claims permit and as far as consistent with the state of the prior art.

What is claimed is:
1. Apparatus for measuring fluid pressure comprising:
   a closed fluid compartment adapted to receive fluid whose pressure is to be measured, said compartment having one wall closed by a disc-shaped diaphragm having an axis, said diaphragm adapted to distend from fluid pressure in said compartment to configurations which vary with the characteristics of the diaphragm,
   a hollow cylindrical housing having an axis substantially coincident with the diaphragm axis and fixedly secured to said compartment adjacent said diaphragm,
   a cylindrical diaphragm overload stop member means having an end surface, and
   means fixedly positioning said stop member in accordance with the characteristics of said diaphragm under a predetermined fluid pressure overload condition, whereby said stop plate substantially conforms to the unimpeded configuration of said diaphragm when distended under said predetermined overload fluid pressure, thereby to more uniformly absorb the force generated by pressure in said fluid compartment acting on the diaphragm.

2. The apparatus set forth in claim 1 wherein said means for fixedly positioning said stop is an epoxy resin.

3. The apparatus set forth in claim 2 wherein the diameter of said stop member is less than the diameter of said housing by an amount such as to form an annular gap of capillary dimensions therebetween, thereby to facilitate retention of the epoxy resin only in desired areas and prevent interference with diaphragm movement.

4. Apparatus for measuring fluid pressure comprising:
   a closed fluid compartment adapted to receive fluid whose pressure is to be measured, said compartment having one wall closed by a disc-shaped diaphragm having an axis, said diaphragm adapted to distend from fluid pressure in said compartment to configurations which vary with the characteristics of the diaphragm,
   a hollow cylindrical housing having an axis substantially coincident with the diaphragm axis and fixedly secured to said compartment adjacent said diaphragm,
   a hollow cylindrical diaphragm overload stop member means having an annular end surface and an axis,
   means fixedly positioning said stop member in accordance with the characteristics of said diaphragm under a predetermined fluid pressure overload condition, whereby said stop plate substantially conforms to the unimpeded configuration of said diaphragm when distended under said predetermined overload fluid pressure, thereby to more uniformly absorb the force generated by pressure in said fluid compartment acting on the diaphragm; and
   a displacement transducer positioned at least partially within said overload stop member and engaging said diaphragm for sensing the magnitude of its distention.

5. Apparatus for measuring fluid pressure comprising:
   a closed fluid compartment adapted to receive fluid whose pressure is to be measured, said compartment having one wall closed by a disc-shaped diaphragm having an axis, said diaphragm adapted to distend from fluid pressure in said compartment to configurations which vary with the characteristics of the diaphragm,
   a hollow cylindrical housing having an axis substantially coincident with the diaphragm axis and fixedly secured to said compartment adjacent said diaphragm,
   a hollow cylindrical diaphragm overload stop member means having an annular end surface and an axis,
   means fixedly and axially positioning said stop member within said housing at a position which is determined by the characteristics of the individual diaphragm under a predetermned fluid pressure overload condition, whereby said stop plate substantially conforms to the unimpeded configuration of said diaphragm when distended under said predetermined overload fluid pressure, thereby to more uniformly absorb the force generated by pressure in said fluid compartment acting on the diaphragm,
   a rod fixedly mounted to the center of said diaphragm and lying on the axis thereof, said rod extending axially through said stop member,
   and a displacement transducer engaging said rod for sensing axial motion thereof.

6. The apparatus set forth in claim 5 wherein said means for fixedly positioning the stop is an epoxy resin.

7. The apparatus set forth in claim 6 wherein the outer diameter of said stop member is less than the diameter of said housing by an amount such as to form an annular gap of capillary dimensions therebetween, thereby to facilitate retention of the epoxy resin only in desired areas and prevent interference with diaphragm movement.

References Cited
UNITED STATES PATENTS

| | | | |
|---|---|---|---|
| 1,399,117 | 12/1921 | Hastings | 73—408 |
| 2,061,761 | 11/1936 | Gaiser | 73—408 |
| 2,220,902 | 11/1940 | Hastings et al. | 73—408 XR |
| 3,223,002 | 12/1965 | Edengordugh | 92—169 |

DAVID SCHONBERG, *Primary Examiner.*

LOUIS PRINCE, *Examiner.*

D. O. WOODIEL, *Assistant Examiner.*